Figure 1:
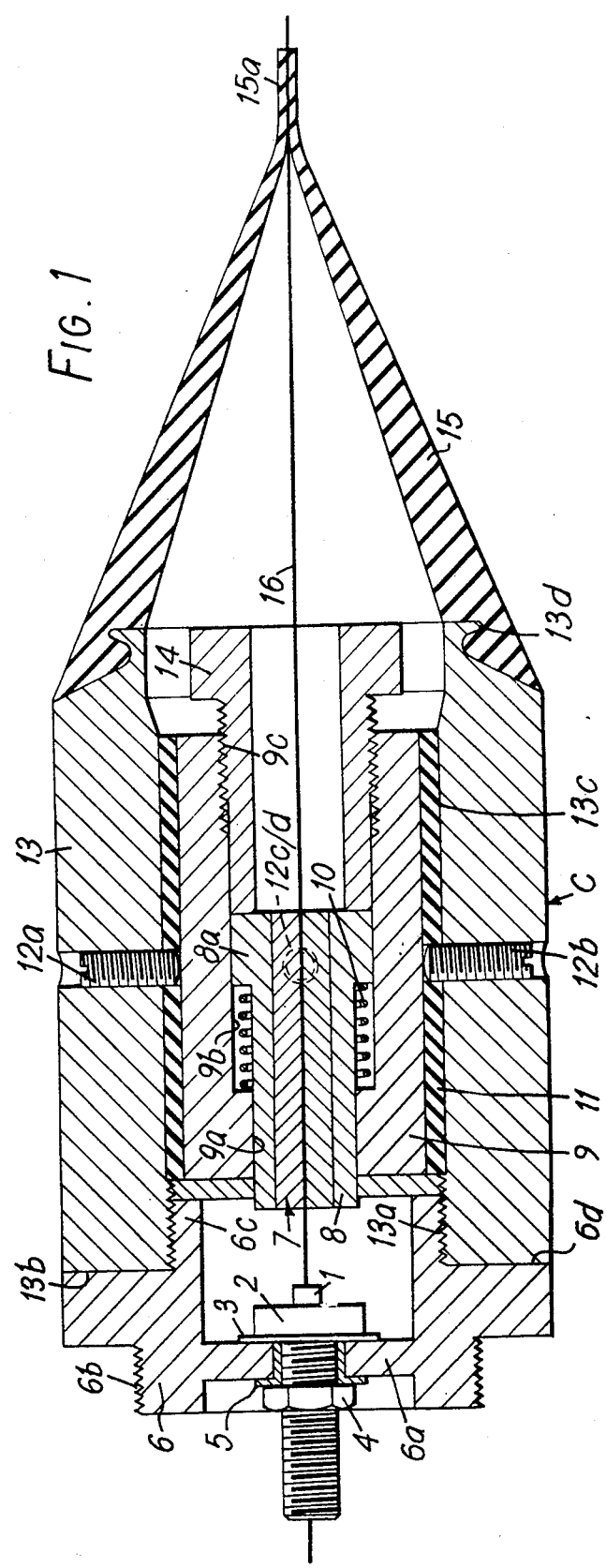

United States Patent [19]
Hennel et al.

[11] 3,954,338
[45] May 4, 1976

[54] MOUNTING OF OPTICAL FIBRES OR OTHER FILAMENTS IN AXIAL ALIGNMENT WITH ONE ANOTHER OR WITH OTHER ELEMENTS

[75] Inventors: Geoffrey Frank Hennel, Iver Heath; Robert Henry Tappin, Old Windsor, both of England

[73] Assignee: Plessey Handel und Investments AG., Zug, Switzerland

[22] Filed: Sept. 4, 1974

[21] Appl. No.: 503,059

[30] Foreign Application Priority Data
Sept. 6, 1973 United Kingdom............... 41947/73

[52] U.S. Cl.............................. 356/138; 350/96 C; 356/153
[51] Int. Cl.²....................................... G01B 11/26
[58] Field of Search..................... 29/271, 464, 559; 250/227; 269/287; 350/96 C, 247; 356/138, 153

[56] References Cited
UNITED STATES PATENTS

| | | | |
|---|---|---|---|
| 2,949,816 | 8/1960 | Weaver............................ | 350/247 |
| 3,628,036 | 12/1971 | Humphrey........................ | 350/96 B |
| 3,847,703 | 11/1974 | Kaiser.............................. | 29/464 |

*Primary Examiner*—John K. Corbin
*Assistant Examiner*—Richard A. Rosenberger
*Attorney, Agent, or Firm*—Fleit & Jacobson

[57] ABSTRACT

In a connector member for optical fibres, a fibre is coaxially held in a holder member which is supported by a silicone-rubber liner interposed between the bore of a housing and the circumference of the holder with the facility of radial adjustment in two mutually perpendicular directions by set screws making use of the compressibility of the liner. Longitudinal adjustment of the fibre is also provided by securing the fibre in a collet bush, in which it is held by a split collet, and which itself is longitudinally adjustable by a hollow coaxial set screw in a guide bore of an outer bush. An assembly jig is also described, in which a retractable tray of a wall supports the collet in front of an axial bore of a slide. This bore accommodates the collet bush, while a filament constituting the fibre is extended in the requisite position, in which it is located by V-grooves in end wall members of the jig.

17 Claims, 3 Drawing Figures

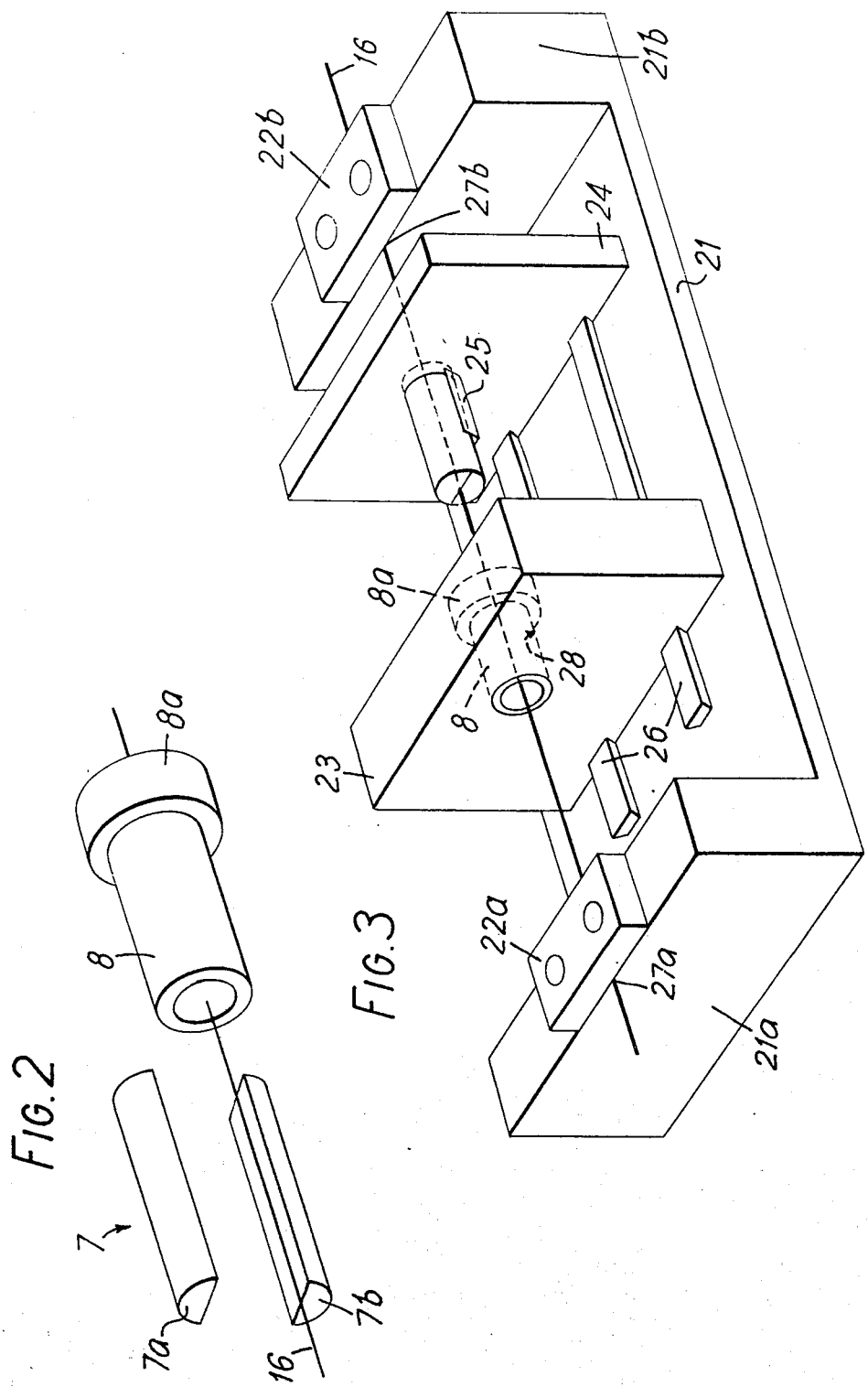

3,954,338

MOUNTING OF OPTICAL FIBRES OR OTHER FILAMENTS IN AXIAL ALIGNMENT WITH ONE ANOTHER OR WITH OTHER ELEMENTS

This invention relates to the mounting of a filament in axial alignment with a second filament or other element, and is more particularly but not exclusively applicable to the mounting of an optical fibre in coupling alignment with another optical fibre or with a photo-electric transducer element. In practical use of optical fibres it is often important to couple an optical fibre to another optical fibre to obtain optimum continuity of light conduction, or to a photo-electric transducer element, for example to a light emitting diode, semiconductor lasers, P.I.N. photo-detector diode (in which P and N layers are separated by an inert layer) or other photo-detector. In all of these cases it is important not only to place the end of the light-conducting fibre at a minimum axial distance from the surface to which it is to be coupled but also to align it with a predetermined point of that surface in a direction normal to that coupling surface of the other element. For this reason it has hitherto been the practice to employ, for assembling the elements which are to be coupled, an optical bench, with the help of which the correct mutual relation could be verified. The use of an optical bench for this purpose is, however, generally undesirable because of restriction in space or for other reasons. The present invention has for an object to provide an improved method and equipment which, without requiring the use of an optical bench, permit an optical fibre to be coupled with another optical fibre or with a photo-electric transducer element and held in such coupling relationship as to ensure the maintenance of accurate alignment and close axial approach and thus of high coupling efficiency.

Another object is to provide a connector member for coupling a filament in axial alignment with a complementary element forming part of the complementary connector member, more particularly for the aligned coupling of an optical fibre with a second optical fibre or with a photoelectric transducer element, which permits, after coupling has been effected by engagement of the connector member with the complementary connector member, the coupling effect to be conveniently optimized by adjustments operative to correct minor errors of alignment and also minor errors of relative axial positioning.

According to the invention an optical fibre or other filament is so secured in a holder body having a circumferential wall surface extending parallel to the filament and preferably forming a cylinder surface coaxial with the filament, that that end of the filament which is to be coupled, projects a short distance axially from the holder body, the latter being supported, through the medium of a layer of an elastomer or of other material which is resiliently deformable similarly to an elastomer, in a housing having means for location in relation to an element to which the fibre is to be coupled, said layer being of substantially uniform thickness and being interposed between, and preferably bonded to, said circumferential surface and the wall of a corresponding passage or cavity in the housing, adjustment means being further provided which act between the housing and holder body to respectively displace the latter, against the resilience of said layer, relative to the housing in two mutually transverse directions both normal to the direction of the filament so as to permit rectification of errors in the alignment of the filament when the filament is thus supported in the housing. Preferably the holder body comprises an inner body, in which the filament is secured, and an outer body which is supported by said layer of elastomer or like material, and in which the inner body is adjustably slidable in the longitudinal direction of the filament so as to also permit the correction of errors in the longitudinal coupling position of the end of the filament.

The correct position of each adjustment can be readily ascertained by observing the output of a photodetector to which the fibre is coupled when the fibre is suitably connected to a source of light or in some equivalent manner which, for any given coupled connection, will be readily selected by a person skilled in the art.

In one form of coupling device according to the invention, the portion of the filament which is to be coupled is supported in a main connector member which includes a housing having coaxial attachment means, and the complementary element to which the filament is to be coupled, is mounted on a complementary connector member provided with coaxial attachment means. The housing has a coaxial passage in which the holder body, constituting a filament-holding element, is supported by a resiliently compressible layer of suitable material, for example of silicone rubber, so as to be normally coaxial with said passage and with said attachment means, the filament being coaxially supported in this holder body with its end that is to be coupled, axially projecting from the body, and at least two adjustable setting devices are arranged to act, at an angle, preferably a right angle, to each other and at a right angle to the length of the passage, upon said holding element at the centre of the support length thereof to displace the axis of the holder body transversely in relation to the common axis of the attachment means and housing. Preferably the holder body comprises a rigid bush in which the filament is held by a divided collet which is inserted into the bore of the bush and which is preferably made of resilient plastics material, for example of a moderately rigid elastomer or of polytetrafluoroethylene.

The setting devices may conveniently consist of radially disposed set screws, each device preferably comprising a pair of two oppositely acting coaxial set screws, the two pairs being offset at a right angle to each other. In this case each set screw of each pair permits positive adjustment in one of two opposite directions, and the finally obtained position of adjustment can then be secured by tightening the second set screw of the pair to obtain a clamping effect.

The collet may conveniently consist of two elements only, each of semicircular cross-section and a suitable jig is preferably provided for accurately locating the filament in the collet so as to extend exactly along the axis of the holding element and to project by exactly the distance required to obtain close coupling contact when the attachment means of the main connector member are fully engaged with the attachment means associated with said complementary connector member containing the complementary element to which the filament is to be coupled.

In order that the invention may be more readily understood, an embodiment will now be described in more detail with reference to the accompanying drawings in which:

FIG. 1 is an axial section showing one form of main connector member according to the invention, in which a filament and a photo-semiconductor element, mounted in a complementary connector member suitable for attachment to a piece of equipment containing an appropriate electrical circuit, are shown in position, FIG. 2 is an exploded perspective view showing the bush and collet of the filament-holding element of the main connector member shown in FIG. 1, and FIG. 3 is a perspective view illustrating a jig suitable for assembling the parts shown in FIG. 2 with an optical fibre filament in accurate coaxial alignment.

Referring now first to FIG. 1, a photo-semiconductor element 1 is coaxially supported in a coaxial-stud package 2 which, by a nut 4, is clamped in a through bore portion 6a of a connector member 6, hereinafter referred to as complementary connector member. This complementary connector member has coaxial external screw threads 6b by which it can be attached at one side to a piece of equipment, for example to a television set. Electrical insulation of the semiconductor element 1 from the equipment and from the coupling member 6 is ensured by a flanged bush 5 and washer 3 of suitable insulating material. The said complementary connector member 6 is further provided at its other or rear side with a coupling collar 6c which has external screw threads and is coaxial with the bore of the wall 6a and thus with the semi-conductor element 1. This coupling collar projects from a flat face 6d which is normal to the said axis of the element 1. An optical-fibre filament 16, whose end is to be coupled coaxially with the semiconductor element 1, is shown with its left-hand end (as seen in the drawing) in close adjacency to the coupling face of the semiconductor element and is held in this position by a main connector member, which is generally indicated by the reference C. This second coupling member comprises a housing 13 one end of which has internal screw threads 13a for co-operation with the external screw threads on the collar 6c of the first coupling member 6, and it has a flat end face 13b for co-operation with the flat face 6d of the said first coupling member 6. A cylindrical metal bush 9 is resiliently supported in a coaxial bore 13c of the housing 13 by an interposed layer 11 of silicone rubber, which is bonded both to the outer surface of the bush 9 and to the wall of the bore 13c.

Two pairs of oppositely-acting coaxial set screws 12a, 12b and 12c, 12d, are arranged in screw-threaded radial bores of the housing 13 to act, through apertures of the layer 11, upon the bush 9 at the centre of its length, and it will be readily appreciated that, by adjusting the said four set screws, minor transverse adjustments of the position of the fibre element 16 can be made in the direction of each of two mutually perpendicular radial co-ordinates to correct minor inaccuracies in the alignment position of the optical-fibre filament 16.

In order to also permit accurate adjustment of the distance of the end of the filament 16 from the surface of the element with which the filament is to be coupled, two coaxial rigid bushes are preferably employed instead of a single integral solid bush. An outer bush 9 is bonded to the housing 13 by the layer 11 of elastomer or suitable material, and a collet bush 8 is slidably guided for axial movement in the outer bush 9 for longitudinal adjustment. The outer bush 9 is provided with a stepped bore 9a, 9b, of which the narrower part 9a faces the first coupling member 6. This bore serves as a guide for the collet bush 8, which has a cylindrical portion slidable in said narrower part 9a, and a flange-like head 8a of greater diameter which is accommodated in the larger-diameter portion 9b of the stepped bore. A spring 10 is interposed between this head and the shoulder formed by the step between the portions 9a and 9b of the said bore, and screw threads 9c in the outermost part of the wider portion 9b of the stepped bore are engaged by a hollow set screw 14, which acts on the outer end face of the flange portion 8a of the collet bush 8 against the force of the spring 10 to determine the longitudinal position of the collet bush 8 in the outer bush 9. The filament 16 is clamped between the two parts of a collet 7 in a manner which is illustrated by the exploded view of FIG. 2, to ensure its coaxial position relative to the collet bush 8.

Referring now to FIG. 2, the collet 7 is formed by two collet members 7a and 7b whose cross-sections are the respective halves of a circle divided along one of its diameters. In order to secure a filament 16 in the collet bush 8, the filament is placed between the two collet members 7a and 7b to extend along the line passing through the centres of the dividing diameters at the two ends of the collet. The collet members, which are preferably made of nylon, are then held clamped together by being slid into the bush 8.

The assembly of the filament, the collet 7, and the collet bush 8 is preferably made with the help of a jig, and a preferred form of such jig is described further below with reference to FIG. 3, together with the manner in which this jig is intended to be used.

When all the so-far mentioned other parts of the second coupling member C have been assembled with the housing 13 in the manner described with reference to FIG. 1, the member C is coupled to its associated first coupling member 6 or, if desired, to a suitable standard first coupling member, and longitudinal and transverse adjustment of the filament is then effected to obtain optimum light transmission through the coupling. After this adjustment the second coupling member C is sealed at its rear end, i.e., at the end which contains the hollow set screw 14, by slipping one end of a rubber gaiter 15, which at its other or rear end portion 15a has a guide passage for the filament 16, over the suitably shaped rear-end portion 13d of the housing 13.

FIG. 3 illustrates a relatively simple jig which greatly facilitates the accurate assembly of the collet bush 8 with the collet 7 and the accurate placement of the filament 16 in the assembly. The jig has a base plate 21 which is provided at two opposite ends with parallel end walls 21a and 21b of equal height. These end walls are each provided with a V-groove 27a and 27b respectively of small cross-section in accurate alignment with each other. These grooves serve for location of a glass-fibre or other filament 16. After insertion of the other parts of the assembly into the jig, this filament is clamped in these grooves with the help of two rubber blocks 22a and 22b, in order to retain its accurate position.

A third wall 24 is fixed to the base 21 in a position parallel to the walls 21a and 21b and has a guide passage for a support tray 25 whose upper surface matches the rounding of the collet 7. This tray normally projects from the third wall 24 towards the end walls 21a in a position suitable to support such collet 7 in exact coaxial alignment with a filament 16 extending between the grooves 27a and 27b, but it is slidable in the guide passage of the wall 24 in a direction away from the end wall 21a for a purpose which will appear hereinafter. A pair of guide rails 26 extend along the base 21a in the longitudinal direction of the filament 16 and are secured to so guide a slide constituting a fourth wall member 23 as to maintain the position of the fourth wall member 23 parallel to the three other wall members 21a, 21b and 24.

The wall member 23 is formed with a bore 28 which is coaxial with the filament 16, and this bore serves to accommodate the smaller-diameter part of the collet bush 8 of the filament-holder element of a coupling as illustrated in FIG. 1, with the flange portion 8a of the bush 8 resting against the rear surface of the wall-member slide 23. When the parts of the jig have been assembled and loaded with parts 7, 8, and 16 as illustrated and so far described, the slide 23 is moved towards the third wall member 24 causing the slide to push the collet bush 8 that rests in the bore 28 of the slide, over the divided collet 7. As the collet enters the bore of the collet bush 8 the fibre 16 is clamped between the two parts of the collet, and the sliding arrangement of the tray 25 permits the tray to retract as the slide 23 approaches the third wall 24 when pushing the collet 7 fully home into the collet bush 8.

The slide 23 can then be moved back towards the end wall 21a and the filament can be released by undoing the fastening means for the rubber blocks 22a and 22b, whereafter the assembly of the collet 7, the collet bush 8 and the filament 16 is removed from the jig and the projecting part of the filament is cut off at a distance of say ⅛ inch from the smaller-diameter end of the collet bush 8. A cutting tool having an edge of sapphire may be used for the purpose.

Various details of the coupling and the jig described with reference to the drawings may be varied without departing from the scope of the present invention. Thus, for example, a cutting tool may be desired, be arranged to be carried by the slide 23 in such a position as to cut off the end of the filament at the requisite point when the slide 23 has reached its closest approach to the third wall member 24, and the latter may be provided with a radial slit to facilitate the removal of the filament from the jig after completion of the assembly.

What we claim is:

1. A method of mounting an optical filament in axial alignment with a second optical element, which comprises the steps of so securing such filament in a holder body having a circumferential external wall surface extending parallel to the length of the filament that one end of the filament projects a short distance axially from the body, said holder body being supported, through the medium of a layer of a material that is resiliently deformable in the manner of an elastomer, in a housing having means for location in relation to the element to which such filament is to be coupled, said layer being of substantially uniform thickness and being interposed between said circumferential surface and the wall of a corresponding passage of the housing, and of effecting adjustment of the holder relative to the housing in two directions transverse to the line of such filament secured in said body, against the resilience of said layer, by the use of adjustment means operative between the housing and the holder body until maximum coupling effect is achieved.

2. A method according to claim 1 wherein said second optical element is an optical fibre.

3. A method according to claim 1 wherein said second optical element is a photo-semiconductor element.

4. A connector member for coupling an optical filament in substantial axial alignment with a complementary optical element having a coupling face arranged substantially on, and at right angles to, the axis of a complementary connector member, said connector member comprising a holder body having means for securing therein a filament to extend along a given line in said body, said holder body having a circumferential external surface coaxial with said line; a housing provided with means for location of said housing in substantially coaxial relation to such complementary connector member and thus to the complementary element to which said fibre is to be coupled, said housing having a circumferential wall forming a passage accommodating said circumferential surface with radial clearance; coaxial sleeve means interposed between said passage-forming wall and said circumferential surface and taking up the whole of said clearance, said sleeve means consisting of a material that is resiliently deformable in the manner of an elastomer; and two adjustment means arranged for operation in a common radial plane between the two ends of the sleeve means for action between said housing and holder body to produce displacement of the latter, relative to the housing, respectively in two mutually transverse directions both perpendicular to said line of filament, the consequential elastic deformation of the sleeve means ensuring the maintenance of a mutually parallel relation of the respective axes of the housing and holder body.

5. A connector member according to claim 4 wherein said complementary optical element is an optical fibre.

6. A connector member according to claim 4 wherein said complementary optical element is a photo-electric transducer element.

7. A connector member as claimed in claim 4, wherein said circumferential surface is a cylinder surface coaxial with said given line.

8. A connector member as claimed in claim 4, wherein said sleeve means of resiliently deformable material is bonded to said circumferential surface and to the wall surface of said passage.

9. A connector member as claimed in claim 4, wherein said holder body includes an inner body having means for securing such filament therein, and an outer body having said circumferential surface, said inner body being supported in said outer body for adjustable sliding displacement therein in the direction of said given line.

10. A connector member as claimed in claim 4, wherein the holder body includes a rigid collet bush having an axial bore, and a collet divided to form dividing surfaces extending substantially along radial planes that include said given line, said collet being fitted in said axial bore and having a filament-locating longitudinal passage extending along the dividing surfaces of the collet.

11. A connector member as claimed in claim 4, further including an optical fibre secured in said holder body in substantially coaxial relation to said housing.

12. The combination comprising a connector member as claimed in claim 11 when fully engaged with such complementary connector member, wherein the end of the optical fibre is substantially in the position of maximum coupling effect relative to the complementary element of such complementary coupling member.

13. A method of mounting an optical fibre, substantially in axial alignment and with substantially maximum coupling effect, in relation to a complementary optical element which has a coupling face arranged substantially on, and at right angles to, the axis of a complementary connector member, in a connector member that comprises: a body having means for securing therein a filament to extend along a given line in said body, said holder body having a circumferential external surface coaxial with said line, a housing provided with means for location of said housing in substantially coaxial relation to such complementary connector member and thus to the complementary element, said housing having a circumferential wall forming a passage accommodating said circumferential surface with radial clearance; coaxial sleeve means interposed between said passage-forming wall and said circumferential surface and taking up the whole of said clearance, said sleeve means consisting of a material that is resiliently deformable in the manner of an elastomer; and two adjustment means arranged for operation in a common radial plane between the two ends of the sleeve means for action between said housing and holder body to produce displacement of the latter, relative to the housing, respectively in two mutually transverse directions both perpendicular to said line of filament, the consequential elastic deformation of the sleeve means ensuring the maintenance of a mutually parallel relation of the respective axes of the housing and holder body, said method comprising the step of so securing the optical fibre in the holder body that one end of said fibre projects a short distance axially from the holder body, the step of thereafter inserting said holder body into the housing, the step of securing the complementary connector member to the housing in such manner that the complementary connector member engages the locating means of the housing and that the projecting end of the fibre is in coupling engagement with said complementary element, and the step of operating each of the adjustment means, while monitoring the coupling effect, in that direction in which such adjustment produces an increase in the coupling effect observed, and continuing such operation until the monitored coupling effect reaches a maximum.

14. A method according to claim 13 wherein said complementary optical element is an optical fibre.

15. A method according to claim 13 wherein said complementary optical element is a photo-electric transducer element.

16. A method as claimed in claim 13, wherein a standard reference member is used as such complementary connector member, and which includes the additional steps of removing said standard reference member from the housing when maximum coupling effect has been achieved by the operation of the adjustment means.

17. A method as claimed in claim 13 for use with a connector member, whose holder body includes a rigid collet bush having an axial bore, and a collet divided to form dividing surfaces extending substantially along radial planes that include said given line, said collet being fitted in said axial bore and having a filament-locating longitudinal passage extending along the dividing surfaces of the collet, wherein the step of securing the optical fibre in the holder body is carried out with the help of a jig which comprises: a main structure having two wall members fixed thereon at a distance from each other and having co-planar surfaces respectively formed with aligned portions of a fibre-locating groove; means for clamping a fibre in said groove portion of each said wall member; collet-locating means associated with one of the said wall members for locating one end of such collet in a position centred in relation to the line of a fibre clamped in said groove, said collet-locating means including a face for supporting said end against movement away from the other wall member; a support tray for such collet, guided for sliding movement relative to said one wall member and face in the direction of said groove from a normal position in which said tray will support the projecting part of such collet located in said collet-locating means, to retain the collet against downward deflection from the position of alignment with the filament; and a collet-bush carrier slide mounted in the jig between said wall members for linear translation movement in the direction of said groove, said slide having a bore for accommodating such collet bush in coaxial alignment with said groove while supporting the bush against longitudinal displacement towards the other wall member, and wherein said step includes the sub-steps of placing a collet bush in position on said collet-bush-carrier slide, clamping, in said aligned portions of the fibre-locating groove, a fibre to extend in a straight line through the bore of said bush, assembling such collet round said fibre and placing the thus assembled collet on to said support tray so as to engage said collet-locating means, and moving the collet-bush-carrier slide to thereby push the collet bush fully over the collet.

* * * * *